United States Patent
Folta et al.

(10) Patent No.: US 6,849,859 B2
(45) Date of Patent: Feb. 1, 2005

(54) FABRICATION OF PRECISION OPTICS USING AN IMBEDDED REFERENCE SURFACE

(75) Inventors: James A. Folta, Livermore, CA (US); Eberhard Spiller, Mt. Kisco, NY (US)

(73) Assignee: Euv Limited Liability Corporation, Santa Clara, CA (US)

(*) Notice: Subject to any disclaimer, the term of this patent is extended or adjusted under 35 U.S.C. 154(b) by 173 days.

(21) Appl. No.: 09/817,334

(22) Filed: Mar. 21, 2001

(65) Prior Publication Data
US 2002/0135778 A1 Sep. 26, 2002

(51) Int. Cl.⁷ .......................... G01N 21/86; H01L 21/66
(52) U.S. Cl. .......................... 250/559.27; 250/559.28; 356/630; 216/60; 438/16; 438/746
(58) Field of Search ................ 216/60, 83–87, 216/94; 438/746, 704, 706, 8, 14, 16, 689–692; 356/515, 630, 514, 496; 250/559.27, 559.28

(56) References Cited

U.S. PATENT DOCUMENTS

| | | | | |
|---|---|---|---|---|
| 2,399,799 A | * | 5/1946 | Guellich | .................... 430/321 |
| 3,658,528 A | * | 4/1972 | Berman et al. | ............. 430/321 |
| 4,482,424 A | * | 11/1984 | Katzir et al. | .................. 216/60 |
| 5,640,242 A | * | 6/1997 | O'Boyle et al. | ............ 356/381 |
| 5,643,472 A | * | 7/1997 | Engelsberg et al. | ........... 216/65 |
| 5,814,528 A | * | 9/1998 | Ju et al. | ....................... 438/16 |
| 6,004,047 A | * | 12/1999 | Akimoto et al. | ............ 396/604 |
| 6,010,538 A | * | 1/2000 | Sun et al. | .................... 756/345 |
| 6,037,270 A | * | 3/2000 | Kageyama et al. | ......... 438/746 |
| 6,111,634 A | * | 8/2000 | Pecen et al. | .................. 356/72 |
| 6,261,152 B1 | * | 7/2001 | Aiyer | ............................ 451/6 |

* cited by examiner

Primary Examiner—Stephone B. Allen
(74) Attorney, Agent, or Firm—John P. Wooldridge; Alan H. Thompson

(57) ABSTRACT

The figure of a substrate is very precisely measured and a figured-correcting layer is provided on the substrate. The thickness of the figure-correcting layer is locally measured and compared to the first measurement. The local measurement of the figure-correcting layer is accomplished through a variety of methods, including interferometry and fluorescence or ultrasound measurements. Adjustments in the thickness of the figure-correcting layer are made until the top of the figure-correcting layer matches a desired figure specification.

31 Claims, 5 Drawing Sheets

FABRICATION OF PRECISION OPTICS USING AN IMBEDDED REFERENCE SURFACE

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to precision mirror fabrication, and more specifically, it relates to techniques for adjusting the figure of a substrate for a precision mirror.

2. Description of Related Art

Present methods for fabricating precision mirrors are very time consuming and costly. The final figure and finish is obtained using many iterations and a precision measurement of the figure is required after each polishing step.

In U.S. Pat. No. 5,957,749, titled "Apparatus For Optical Inspection Of Wafers During Polishing" an optical system is disclosed for the inspection of wafers during polishing which also includes a measurement system for measuring the thickness of the wafer's top layer. The optical system views the wafer through a window and includes a gripping system, which places the wafer in a predetermined viewing location while maintaining the patterned surface completely under water.

U.S. Pat. No. 4,018,638, titled "Method Of Reducing The Thickness Of A Wafer Of Fragile Material" is method of reducing the thickness of a wafer of fragile material, e.g., pyroelectric material, by placing the wafer, supported only at its rim, in a holder filled with a non-corrosive liquid.

U.S. Pat. No. 4,793,895, titled "In Situ Conductivity Monitoring Technique For Chemical/Mechanical Planarization Endpoint Detection" discloses an apparatus and method for monitoring the conductivity of a semiconductor wafer during the course of a polishing process.

The invention disclosed in U.S. Pat. No. 5,081,421, titled "In Situ Monitoring Technique And Apparatus For Chemical/Mechanical Planarization Endpoint Detection" provides an in situ monitoring technique and apparatus for chemical/mechanical planarization end point detection in the process of fabricating semiconductor or optical devices. The detection in the present invention is accomplished by means of capacitively measuring the thickness of a dielectric layer on a conductive substrate.

In U.S. Pat. No. 5,125,740, titled "Method And Apparatus For Measuring Optical Constants Of A Thin Film As Well As Method And Apparatus For Fabricating A Thin Film Utilizing Same", a sample is located so as to be close to a prism and a light beam coming from a light source is projected to the prism while varying the incident angle to the prism as a parameter. Optical constants such as the refractive index, the film thickness, the distribution of the refractive index, etc. are obtained by calculation, starting from measured values thus obtained.

In U.S. Pat. No. 5,157,877, titled "Method For Preparing A Semiconductor Wafer", the polishing of a semiconductor is effected by a method which comprises preparing a finished backing pad by the precision surface machining operation, setting the semiconductor wafer on a wafer holding jig having a template containing at least one wafer-positioning hole fixed on a carrier plate in such a manner that the backing pad enters the positioning hole, and polishing the semiconductor wafer.

U.S. Pat. No. 5,240,552, titled "Chemical Mechanical Planarization (Cmp) Of A Semiconductor Wafer Using Acoustical Waves For In-Situ End Point Detection" describes a method and apparatus for chemically mechanically planarizing (CMP) a semiconductor wafer.

U.S. Pat. No. 5,293,216, titled "Sensor For Semiconductor Device Manufacturing Process Control" describes a fiber-optic sensor device for semiconductor device manufacturing process control that measures polycrystalline film thickness as well as surface roughness and spectral emissivity of a semiconductor wafer.

U.S. Pat. No. 5,337,015, titled "In-Situ Endpoint Detection Method And Apparatus For Chemical-Mechanical Polishing Using Low Amplitude Input Voltage", discloses an in-situ thickness monitoring/endpoint detection method and apparatus for chemical-mechanical polishing (CMP) of a dielectric layer on a top surface of a semiconductor wafer.

U.S. Pat. No. 5,433,651, titled "In-Situ Endpoint Detection And Process Monitoring Method And Apparatus For Chemical-Mechanical Polishing" discloses an in-situ chemical-mechanical polishing process monitor apparatus for monitoring a polishing process during polishing of a workpiece in a polishing machine.

U.S. Pat. No. 5,492,594, titled "Chemical-Mechanical Polishing Tool With End Point Measurement Station" discloses a wafer polishing and planarizing tool in which there is incorporated a separate measuring station and means for moving the wafer and immersing the wafer into the measuring station without removing it from the polishing head.

U.S. Pat. No. 5,657,123, titled "Film Thickness Measuring Apparatus, Film Thickness Measuring Method And Wafer Polishing System Measuring A Film Thickness In Conjunction With A Liquid Tank" provides a light interference-type film thickness measuring mechanism that measures a film thickness with light directed onto the bottom surface of a wafer held by a wafer holding head.

U.S. Pat. No. 5,658,418, titled "Apparatus For Monitoring The Dry Etching Of A Dielectric Film To A Given Thickness In An Integrated Circuit" discloses detecting the desired etch end point in the dry etching of a structure.

U.S. Pat. No. 5,719,495, titled "Apparatus For Semiconductor Device Fabrication Diagnosis And Prognosis" provides a sensor for diagnosis and prognosis of semiconductor device fabrication processes that measures specular, scattered, and total surface reflectances and transmittances of semiconductor wafers.

In U.S. Pat. No. 5,739,906, titled "Interferometric Thickness Variation Test Method For Windows And Silicon Wafers Using A Diverging Wavefront", an interferometric apparatus and method are provided for determining a seal thickness and thickness variations of silicon wafers and other window-like optics. Thin films have been used in the past to correct the figure of mirrors by depositing thin films of the desired thickness profile on top of a substrate using evaporation masks. See W. C. Sweatt. J. W. Weed, A. V. Farnsworth, M. E. Warren, M. E. Neumann, R. S. Goeke, and R. N. Shagan, "Improving The Figure Of Very Good Mirrors By Deposition," OSA Trends in Optics and Photonics Vol.4, "Extreme Ultraviolet Lithography", G. Kubiak and D. Kania, Eds. Washington, D.C., Optical Soc. Of America, 1996., pp. 149–155. See also C. Tarrio, E. Spiller, C. J. Evans, T. B. Lucatorto, and C. C. V, "Post-Polish Figuring Of Optical Surfaces Using Multilayer Deposition," ibid., pp. 144–148. However, it is time consuming and requires many iterations to produce the masks for general corrections in 2-D that is described by higher order polynomials.

As discussed above, precision mirrors are currently fabricated by using a large number of iterations between polishing/figuring and interferometric metrology of the surface figure. No data on the figure is available during polishing and the process is very time consuming. In some cases, about a day is needed in each iteration just to reach a stable temperature of the optic in the interferometer. Current methods make it very difficult to fabricate mirrors fast enough to provide for the expected number of commercial Extreme Ultraviolet Lithography (EUVL) steppers that will be needed. In order to accelerate production, it is desirable to connect metrology and polishing more tightly, ideally into a single procedure.

SUMMARY OF THE INVENTION

It is an object of the present invention to provide a method for correcting the figure of a substrate.

It is another object of the invention to apply a figure-correcting layer to a substrate and to adjust the thickness of the figure-correcting layer to obtain a desired figure.

Another object of the invention is to apply a marker layer to a substrate before applying a figure-correcting layer, where the marker layer is sandwiched between the substrate and the figure-correcting layer.

Still another object of the invention is to adjust the thickness of a figure-correcting layer with a beam selected from the group consisting of an electron beam, an ion beam and an electromagnetic beam.

Another object of the invention is to adjust the thickness of a figure-correcting layer with a polishing tool.

Another object of the invention is to simultaneously measure and adjust the thickness of a thickness-correcting layer adherent to a substrate to obtain a desired figure.

Another object of the invention is to measure the thickness of a figure-correcting layer simultaneously at a plurality of points.

These and other objects of the present invention will be apparent to those skilled in the art based on the disclosure herein.

In one embodiment of the present invention, the substrate is measured with a very precise instrument such as an embodiment of the Phase Shifting Diffraction Interferometer disclosed in U.S. Pat. No. 5,548,403, titled "Phase Shifting Diffraction Interferometer" and U.S. Pat. No. 5,933,236, titled "Phase Shifting Interferometer", both patents incorporated herein by reference. If a figure-correcting layer is made of material that has a different index of refraction from that of the substrate, then the figure-correcting layer may be deposited directly on the substrate surface. If a figure-correcting layer is made of material that has nearly the same index of refraction as that of the substrate, then a marker layer is deposited onto the substrate and the figure-correcting layer is deposited directly on the marker layer. The thickness of the figure-correcting layer is locally measured and the desired thickness is obtained from the phase shifting diffraction interferometer (PSDI) measurement. Adding the thickness of the figure-correcting layer to the figure of the substrate is readily performed with many commercially available numerical analysis or image processing software products. For example, see a product by Research Systems, Inc. titled "Interactive Data Language" (see http://www.rsinc.com/idl/index.cfm). The local measurement of the figure-correcting layer is accomplished through a variety of methods, including interferometry and fluorescence or ultrasound measurements. Adjustments in the thickness of the figure-correcting layer are made until the top of the figure-correcting layer matches the figure specification.

DETAILED DESCRIPTION OF THE PREFERRED EMBODIMENTS

Figure 1A:
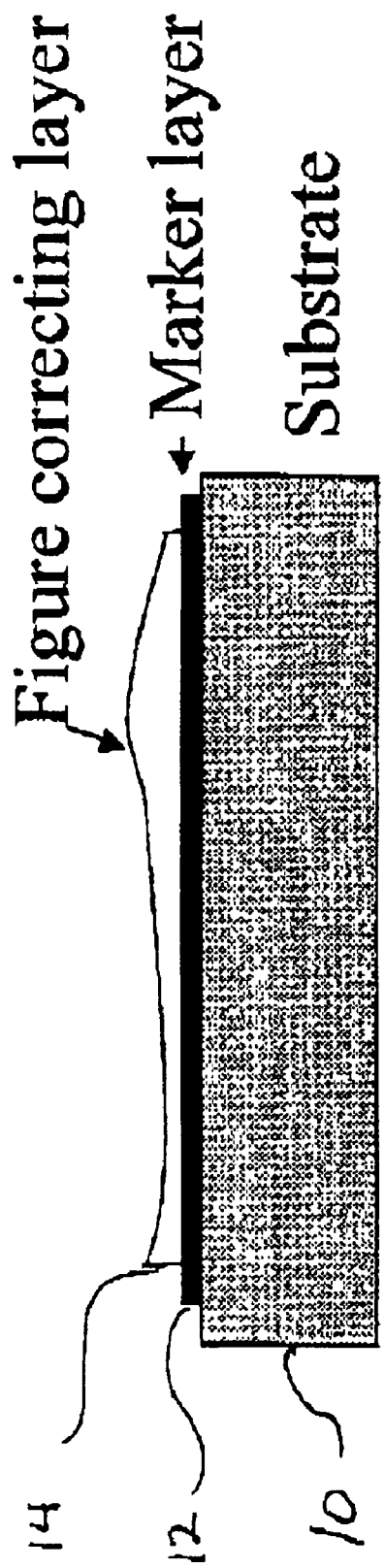
FIG. 1A illustrates a mirror substrate with an adherent marker layer and a figure-correcting layer.

In the preferred methodology, the first step is to generate a reference surface and protect its figure from any change during the subsequent polishing/figuring process. In a subsequent step, the top surface is modified until the measured difference between the reference and the real surface is equal to the value calculated from the specification of the optics. This later step requires a process to either add or remove material and to measure locally the thickness of the material added or removed. In the case that the deposition or removal process is well calibrated, it is possible to skip the local thickness measurement.

The optic is figured and polished by standard established methods, to a figure close to the desired one. For typical EUV optics, the figuring might be stopped at figure errors around 5–10 nm. The stopping point is determined by economy. Tighter tolerances in this first step require more efforts, but will reduce the requirement for the subsequent processes. The surface produced and characterized is used as the reference surface.

The reference surface has to be protected from any change in the subsequent figuring/polishing processes. If addition of material is used for the final figuring, the only requirement is that the reference surface remains observable and its distance to the actual surface can be measured. In one embodiment, it is required that the material to be added is different from the material of the substrate. In another embodiment, the reference surface could be marked by the addition of a thin layer of additional material with a different index of refraction. Since the reference surface is protected by burying it under the surface of the figure-correcting layer, the removal of material never affects the reference surface. This can be achieved by first providing a marker layer over the reference surface and then depositing a protective layer over the marker layer that will be modified in thickness to produce the desired figure. During the final polishing/figuring process, it is only necessary to measure the thickness of the material above the reference surface locally to derive the figure of the optics. There are a large number of methods to measure the thickness of a film with precision in the Angstrom range. Examples are interference between radiation reflected from the reference surface and the top surface of the optics using visible, UV, or x-ray radiation, ultrasound, fluorescence, etc. Many of these methods have considerably higher precision than the metrology to measure the figure of a large optics and the figure errors in the final optics will be the metrology error in the first measurement of the reference surface.

For optical detection, the marking layer should have a similar reflectivity as the top surface to produce maximum interference contrast. For a mirror material with refractive index of 1.5 and reflectivity of 4%, the amount of material imbedded in an index n=1.5 material corresponds to thicknesses of 1.5, 6, 3.5, 4, 3.5, 2.7, and 3.7 nm for Al, Cr, Co, Ni, Ti, Mo, and Si, respectively, of bulk density. Many other materials may be imbedded within the marker material. One could imbed the materials by ion implantation or by vacuum deposition. If vacuum deposition and a subtractive figuring process are used, an additional film of glass or other appropriate material can act as the protective layer and provide the material for subsequent figure correction.

No additional marking layer is required for the case in which a figure correcting film of a different material is added after measuring the figure of the substrate.

Figure 1B:
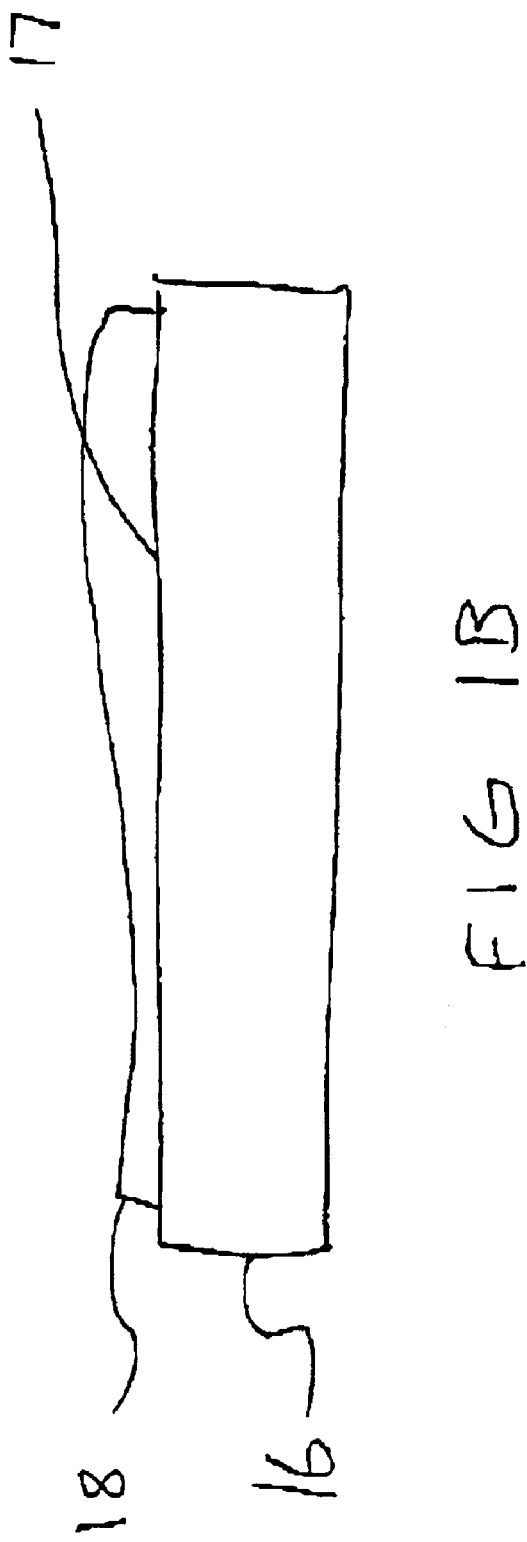
FIG. 1B shows a substrate and an adherent figure-correcting layer.

FIG. 1A illustrates a mirror substrate 10 with an adherent marker layer 12 and figure-correcting layer 14. The mirror substrate figure has been measured in an interferometer. In one embodiment, the marker layer 12 has a uniform thickness and conforms to the surface topology of the substrate 10. Figure-correcting layer 14 adheres to marker layer 12. The index of refraction of the figure-correcting layer 14 may be identical to that of the substrate when used with the marker layer, but must be different from the index of refraction of the marker layer. The thickness distribution of the figure-correcting layer is adjusted to provide figure errors to the level required for diffraction-limited performance. FIG. 1B shows a substrate 16 and an adherent figure-correcting layer 18. For an embodiment such as this that has no marker layer, it is required that the substrate 16 have a first index of refraction and the figure-correcting layer 18 have a second index of refraction that is substantially different from that of the first index of refraction. The index of refraction difference provides an interface 17 between substrate 16 and figure-correcting layer 18. This index difference will generate reflections of electromagnetic and ultrasound waves for use in measuring the thickness of the figure-correcting layer.

A deposition process where thickness is measured locally and the local deposition rate or time is adjusted until the desired thickness is found is preferable. Photon, ion, or electron beam activated deposition processes can be used for this purpose. An example is the deposition of a carbon film from the cracking of hydrocarbons. The thickness of the deposited film is in many cases proportional to the total flux; in this case the thickness of the correcting film is simply determined by the total illumination intensity at each location. For local in-situ thickness measurements, one can incorporate the thickness measurement tool within the exposure tool.

The reflectivity from the optics is modulated by interference between the surface and the reference surface. Interference fringes can be observed by tuning wavelength and the thickness of the correcting layer is calculated from the position of the extrema. A very compact sensor that uses optical fibers for the incoming and reflected light can be incorporated into a mechanical polishing tool. Thickness monitors using this principle are commercially available.

When figuring by an ion beam is used, the test beam can be focused at the location of the ion beam.

Figure 2:
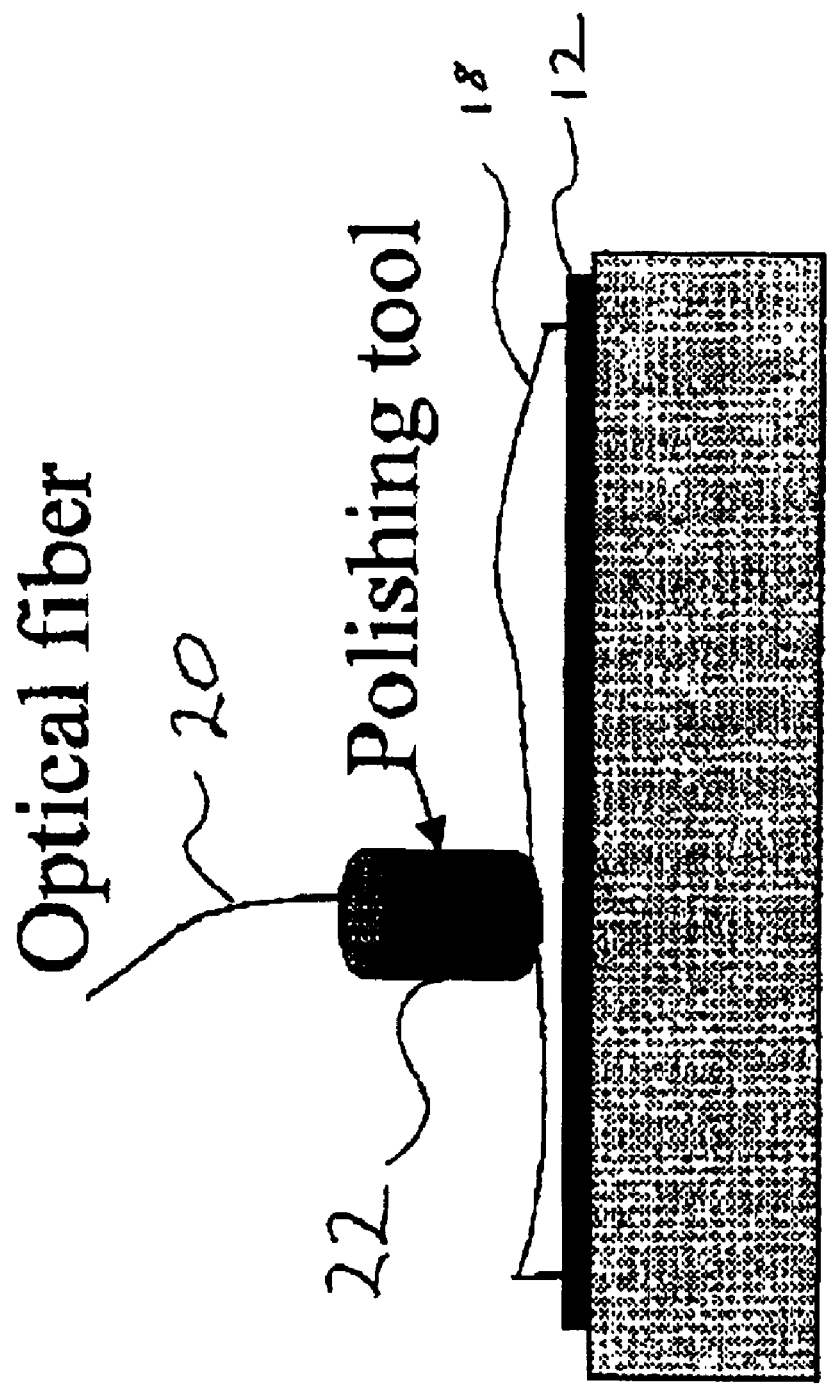
FIG. 2 shows an example of an implementation of the invention, where the thickness-measuring tool comprises one or more fiber optics incorporated into a mechanical polishing tool.

FIG. 2 shows an example of an implementation of the invention, where the thickness-measuring tool comprises one or more fiber optics 20 incorporated into a mechanical polishing tool 22. The optical fiber(s) 20 illuminates the surface of the figure-correcting layer 18 and the interface 17 or marker layer 12 and sends the reflected signal back to a monochromator or detector for analysis to obtain the local thickness of the correcting layer 18.

Reflection of ultrasound can be used to measure the thickness of the figure-correcting layer. By measuring the time difference between the two pulses that are obtained from the reflection of a short ultrasound pulse from the top and bottom surface of the figure-correcting layer, the thickness of the figure-correcting layer can be determined.

The concentration of marker material at the surface of the figure-correcting layer can be used to indicate its thickness. Ion beam implantation can be used to control the location and profile of the marker material within the figure-correcting layer. As material is removed, it can be analyzed to determine marker material concentration. The concentration near the surface can be used to obtain the distance to the centroid of the profile.

Fluorescence of soft x-rays or x-rays can be used to indicate the thickness of the figure-correcting layer. The fluorescence signal from the marker material is attenuated in the correction layer and its thickness can be derived from the strength of the signal. This method would be suitable for controlling ion beam figuring.

Figure 3:
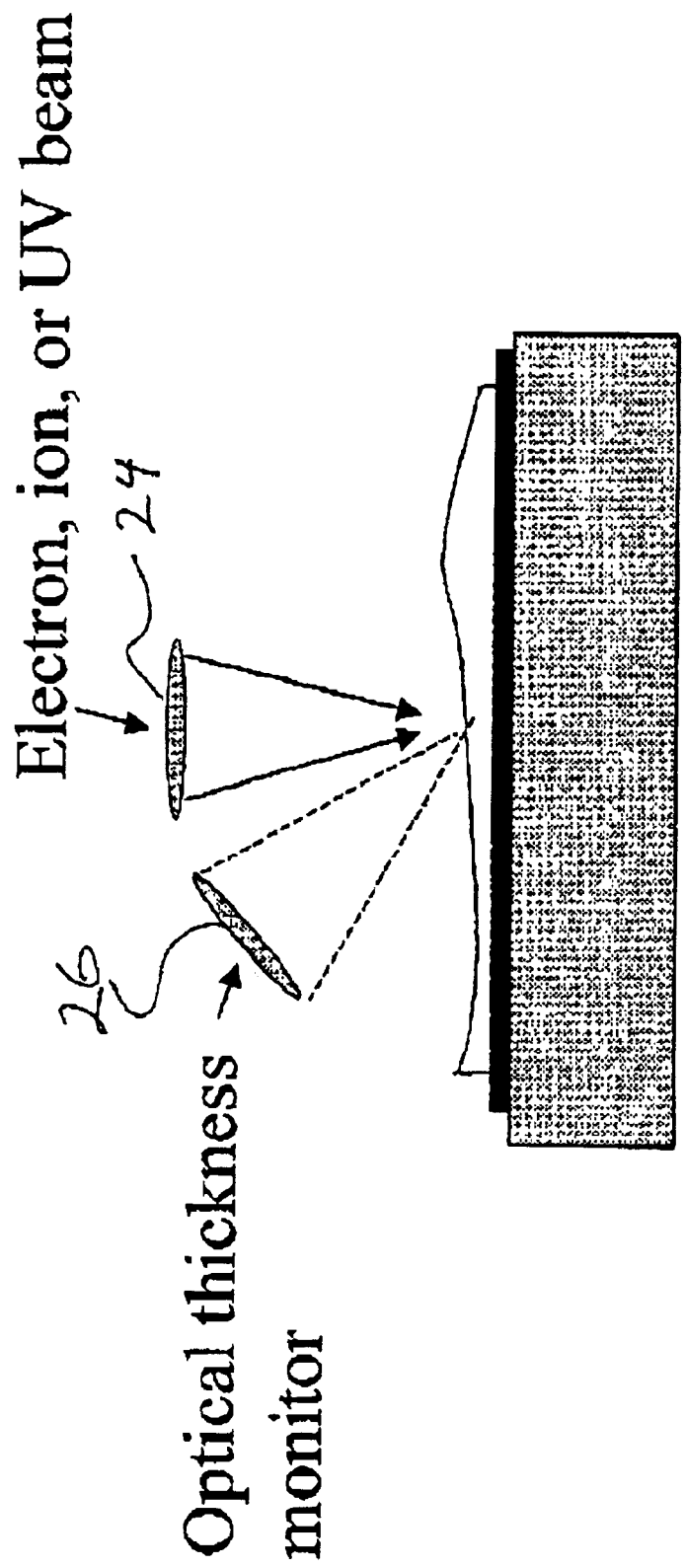
FIG. 3 illustrates an embodiment for simultaneously measuring the thickness of the figure-correcting layer while modifying its thickness.

FIG. 3 illustrates the modification of the thickness of the figure-correcting layer. The modification is accomplished through an electron, ion, or photon induced deposition or etching process 24, and the thickness is monitored with an optical monitor 26. Other examples techniques useful for thickness determination are x-ray fluorescence from the marker layer where the thickness is determined from the absorption in the correcting layer, or fluorescence from the correcting layer, where the signal increases with the thickness of the correcting layer.

Figure 4:
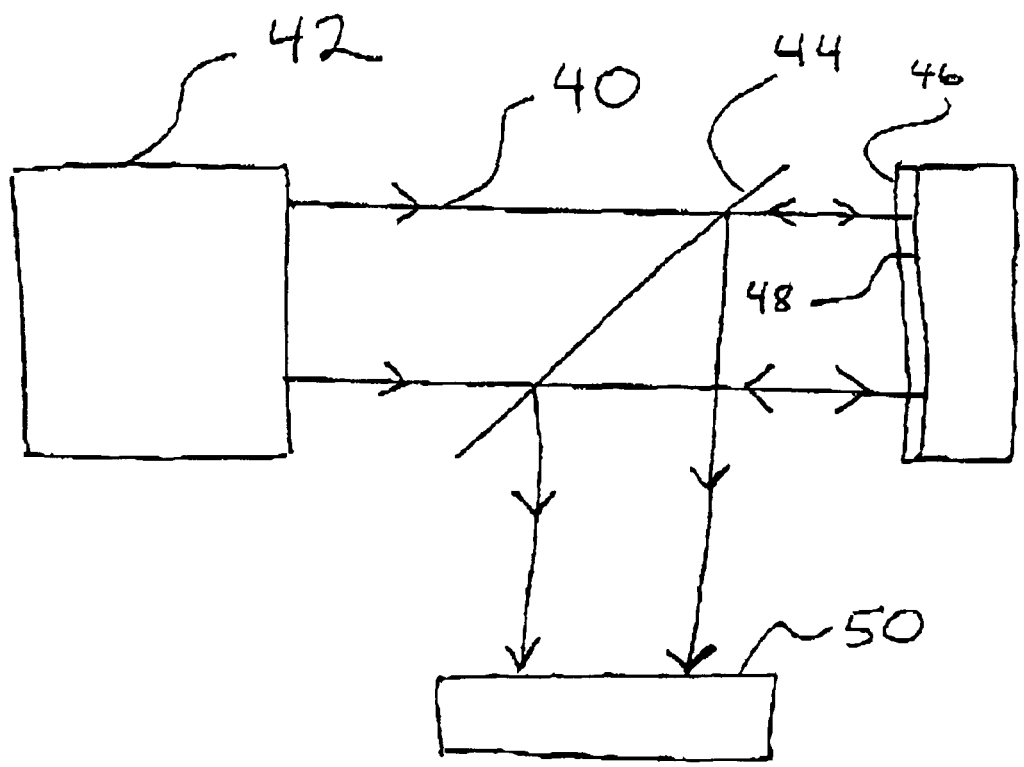
FIG. 4 shows an embodiment for measuring the thickness of the figure-correcting layer at a plurality of points simultaneously.

FIG. 4 shows an embodiment for measuring the thickness of the figure-correcting layer at a plurality of points simultaneously. In the figure, a collimated beam of light 40 from a monochromatic light source 42 passes through a beamsplitter 44 and is reflected from figure-correcting layer 46 and interface 48. This reflected light is reflected from beamsplitter 44 onto a two-dimensional detector array 50.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method for correcting the figure of a substrate, comprising:

measuring the figure of a surface of said substrate;

attaching a figure-correcting layer to a surface of said substrate;

locally adjusting the thickness of said figure-correcting layer; and measuring the thickness of said figure-correcting layer.

2. The method of claim 1, further comprising iterating between the steps of locally adjusting the thickness of said figure-correcting layer and measuring the thickness of said figure-correcting layer until a desired figure is obtained.

3. The method of claim 1, wherein said figure-correcting layer comprises an index of refraction that is nearly the same as the index of refraction of said substrate.

4. The method of claim 3, further comprising applying a marker layer to said substrate before applying said figure-correcting layer, wherein said marker layer is located between said substrate and said figure-correcting layer.

5. The method of claim 1, wherein the step of measuring the figure of said substrate is carried out with a phase shifting diffraction interferometer.

6. The method of claim 1, wherein the thickness of said figure-correcting layer is known.

7. The method of claim 1, wherein said figure-correcting layer comprises an index of refraction that is different from the index of refraction of said substrate.

8. The method of claim 1, wherein said figure-correcting layer comprises an optical material having embedded material selected from the group consisting of Al, Cr, Co, Ni, Ti, Mo, and Si.

9. The method of claim 1, wherein the step of locally adjusting the thickness of said figure-correcting layer is carried out with a beam selected from the group consisting of an electron beam, an ion beam and an electromagnetic beam.

10. The method of claim 9, wherein said electromagnetic beam comprises light selected from the group consisting of visible light, ultraviolet light, infrared light and x-ray light.

11. The method of claim 1, wherein the step of measuring the thickness of said figure-correcting layer is carried out with an optical method selected from the group consisting of interferometry and reflectance spectroscopy.

12. The method of claim 1, wherein the step of measuring the thickness of said figure-correcting layer is carried out with fluorescence.

13. The method of claim 1, wherein the step of measuring the thickness of said figure-correcting layer is carried out with ultrasound.

14. The method of claim 1, further comprising comparing said thickness of said figure-correcting layer to said figure of said surface of said substrate to determine the figure of the substrate in combination with said figure-correcting layer.

15. The method of claim 1, wherein the step of locaily adjusting the thickness of said figure-correcting layer comprises adding material to said figure-adjusting layer.

16. The method of claim 1, wherein the step of locally adjusting the thickness of said figure-correcting layer comprises removing material from said figure-adjusting layer.

17. The method of claim 1, wherein the step of locally adjusting the thickness of said figure-correcting layer comprises adding material to said figure-correcting layer and removing material from said figure-correcting layer.

18. The method of claim 1, wherein the step of locally adjusting the thickness of said figure-correcting layer is carried out with a polishing tool.

19. The method of claim 1, wherein the step of measuring the thickness of said figure-correcting layer is carried out at a plurality of points simultaneously.

20. The method of claim 19, wherein the step of measuring the thickness of said figure-correcting layer at a plurality of points simultaneously is carried out with a two-dimensional detector.

21. The method of claim 1, wherein the step of measuring the figure of said surface of said substrate is carried out prior to the step of applying a figure-correcting layer to a surface of said substrate.

22. The method of claim 1, wherein the step of measuring the figure of said surface of said substrate is carried out after the step applying a figure-correcting layer to a surface of said substrate.

23. A method for correcting the figure of a substrate, comprising:

attaching a figure-correcting layer to an interface;

attaching said interface to a surface of said substrate, wherein said interface is between said substrate and said figure-correcting layer;

locally adjusting the thickness of said figure-correcting layer to produce a desired surface figure; and measuring the thickness of said figure-correcting layer.

24. The method of claim 23, further comprising measuring the figure of said substrate either before or after the step of applying a figure-correcting layer.

25. The method of claim 23, further comprising iterating between the steps of locally adjusting the thickness of said figure-correcting layer and measuring the thickness of said figure-correcting layer until a desired figure is obtained.

26. The method of claim 23, wherein said figure-correcting layer comprises an index of refraction that is nearly the same as the index of refraction of said substrate, wherein said interface comprises a marker layer.

27. The method of claim 23, wherein said figure-correcting layer comprises an index of refraction that is different from the index of refraction of said substrate.

28. The method of claim 23, wherein the step of locally adjusting the thickness of said figure-correcting layer is carried out with a beam selected from the group consisting of an electron beam, an ion beam and an electromagnetic beam.

29. The method of claim 23, wherein the step of measuring the thickness of said figure-correcting layer is carried out with an optical method selected from the group consisting of interferometry, optical reflectance spectroscopy, ultrasound reflectance spectroscopy and fluorescence measurement.

30. The method of claim 23, further comprising comparing said thickness of said figure-correcting layer to said figure of said surface of said substrate to determine the figure of the substrate in combination with said figure-correcting layer.

31. The method of claim 23, wherein the step of locally adjusting the thickness of said figure-correcting layer is carried out with a step selected from the group consisting of adding material to said figure-adjusting layer, removing material from said figure-adjusting layer and a combination of adding material to said figure-correcting layer and removing material from said figure-correcting layer.

* * * * *